United States Patent
Clark et al.

(10) Patent No.: US 6,262,149 B1
(45) Date of Patent: *Jul. 17, 2001

(54) ACRYLIC MODIFIED WATERBORNE SULFONATED ALKYD DISPERSIONS

(75) Inventors: Mark D. Clark; Thauming Kuo; Rebecca R. Stockl; Glen D. Shields, all of Kingsport, TN (US)

(73) Assignee: Eastman Chemical Company, Kingsport, TN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/133,484

(22) Filed: Aug. 12, 1998

Related U.S. Application Data

(60) Provisional application No. 60/055,140, filed on Aug. 12, 1997.

(51) Int. Cl.$^7$ .................. C08F 283/01; C08G 63/12; C08G 63/688; C09D 151/08; C09D 167/08
(52) U.S. Cl. .................. 523/501; 524/457; 524/539; 524/603; 524/609; 524/845; 524/846; 525/7; 525/7.1
(58) Field of Search .................. 524/846, 457, 524/539, 845, 603, 609; 525/445, 447, 7, 7.1; 523/501

(56) References Cited

U.S. PATENT DOCUMENTS

| | | |
|---|---|---|
| 3,345,313 | 10/1967 | Ruhf et al. .................. 260/22 |
| 3,734,874 | 5/1973 | Kibler et al. .................. 260/29.2 |
| 3,778,395 | 12/1973 | Huelsman et al. .................. 260/22 |
| 3,894,978 | 7/1975 | Montesissa et al. .................. 260/22 |
| 3,979,346 | 9/1976 | Zuckert et al. .................. 269/23 |
| 4,011,388 | 3/1977 | Murphy et al. .................. 526/320 |
| 4,026,850 | 5/1977 | Frank et al. .................. 260/22 |
| 4,116,902 | 9/1978 | Harris et al. .................. 260/22 |
| 4,178,425 | 12/1979 | Emmons et al. .................. 528/73 |
| 4,180,645 | 12/1979 | Emmons et al. .................. 528/73 |
| 4,222,911 | 9/1980 | Christenson et al. .................. 260/22 |
| 4,293,471 | 10/1981 | Heiberger .................. 260/22 CB |
| 4,299,742 | 11/1981 | Belder et al. .................. 260/22 |
| 4,301,048 | 11/1981 | Hirayama et al. .................. 260/22 |
| 4,333,864 | 6/1982 | Zückert .................. 525/501.5 |
| 4,413,073 | 11/1983 | Gibson et al. .................. 523/511 |
| 4,414,357 | 11/1983 | Wright et al. .................. 524/513 |
| 4,436,849 * | 3/1984 | Aihara et al. .................. 523/501 |
| 4,451,596 | 5/1984 | Wilk et al. .................. 523/501 |
| 4,504,609 * | 3/1985 | Kuwajima et al. .................. 523/501 |
| 4,698,391 | 10/1987 | Yacobucci et al. .................. 525/162 |
| 4,737,551 | 4/1988 | Dervan et al. .................. 525/440 |
| 4,916,181 * | 4/1990 | Maska et al. .................. 524/457 |
| 5,011,883 | 4/1991 | Aksman .................. 524/513 |
| 5,102,925 | 4/1992 | Suzuki et al. .................. 523/500 |
| 5,296,530 | 3/1994 | Bors et al. .................. 524/558 |
| 5,349,026 | 9/1994 | Emmons et al. .................. 525/328.6 |
| 5,371,148 | 12/1994 | Taylor et al. .................. 525/293 |
| 5,378,757 * | 1/1995 | Blount, Jr. et al. .................. 524/608 |
| 5,422,392 | 6/1995 | Floyd et al. .................. 524/457 |
| 5,484,849 | 1/1996 | Bors et al. .................. 525/167.5 |
| 5,494,975 | 2/1996 | Lavoie et al. .................. 525/928.6 |
| 5,525,662 | 6/1996 | Lavoie et al. .................. 524/558 |
| 5,530,059 | 6/1996 | Blount, Jr. et al. .................. 524/604 |
| 5,538,760 | 7/1996 | Sharma .................. 427/388.4 |
| 5,539,073 | 7/1996 | Taylor et al. .................. 526/323 |
| 5,559,192 | 9/1996 | Bors et al. .................. 525/300 |
| 5,569,715 | 10/1996 | Grandhee .................. 525/7 |
| 5,686,518 | 11/1997 | Fontenot et al. .................. 524/458 |

FOREIGN PATENT DOCUMENTS

| | | |
|---|---|---|
| 0 457 276 | 11/1991 | (EP) . |
| 0 555 903 | 8/1993 | (EP) . |
| WO 83/00151 * | 1/1983 | (WO) .................. C08F/2/26 |
| 95/02019 | 1/1995 | (WO) . |
| WO 95/02019 * | 1/1995 | (WO) .................. C09D/167/08 |

OTHER PUBLICATIONS

Wang et al., "Emulsion and Miniemulsion Copolymerization of Acrylic Monomers in the Presence of Alkyd Resin," *Journal of Applied Polymer Science*, vol. 60, pp. 2069–2076 (1996).

Wicks et al., *Organic Coatings: Science and Technology*, vol. I: Film Formation, Components, and Appearance, eds. John Wiley & Sonsw, Inc., pp. 200–201 (1992).

Solomon, *The Chemistry of Organic Film Formers*, eds. John Wiley & Sons, Inc., pp. 212–218 and p. 330 (1967).

* cited by examiner

*Primary Examiner*—David W. Wu
*Assistant Examiner*—Kelechi Egwim
(74) *Attorney, Agent, or Firm*—Rose M. Allen

(57) ABSTRACT

A water-based latex of an acrylic-modified waterborne alkyd dispersion in water is described. The acrylic-modified waterborne alkyd is a hybrid resin prepared by the polymerization of at least one ethylenically unsaturated monomer in the presence of a waterborne alkyd having at least one pendant sulfonate functionality. The ethylenically unsaturated monomer may also be a latent oxidatively functional (LOF) acrylic monomer. Preparation of the latexes may be achieved by emulsion polymerization of at least one ethylenically unsaturated monomer in the presence of a waterborne alkyd having at least one pendant sulfonate functionality. Preparation of hybrid latexes which contain latent oxidative functional (LOF) acrylic monomers may also be achieved by emulsion polymerization of at least one LOF acrylic monomer in the presence of a waterborne alkyd having at least one pendant sulfonate functionality whereby the latent oxidative functionality of the acrylic polymer survives polymerization. Such acrylic-modified waterborne alkyds are useful in a variety of coating compositions.

19 Claims, No Drawings

ACRYLIC MODIFIED WATERBORNE SULFONATED ALKYD DISPERSIONS

This application claims priority of provisional application(s) No. 60/055,140 filed on Aug. 12. 1997, which is incorporated by reference herein.

BACKGROUND OF THE INVENTION

1. Field of the Invention

The invention relates to a water-based latex of an acrylic modified waterborne alkyd dispersion in water. Such acrylic modified waterborne alkyds are useful in a variety of coating compositions.

2. Description of Related Art

In recent years, considerable effort has been expended by the coatings industry to develop low or zero VOC containing coating formulations. Regulations to limit the amount of VOC content of industrial coatings have encouraged research and development to explore new technologies directed at reducing solvent emissions from industrial solvent-based coatings operations such as automotive, appliance, general metal, furniture, and the like. One technology involves the replacement of organic solvents with water and is of particular interest for the obvious reasons of availability, cost, and environmental acceptability. However, while the move from organic solvent-based compositions to aqueous compositions brings health and safety benefits, aqueous coating compositions must meet or exceed the performance standards expected from solvent-based compositions. The need to meet or exceed such performance standards places a premium on the characteristics and properties of waterborne polymer dispersions used in aqueous coating compositions.

Waterborne polymer dispersions have been prepared from each of the three primary industrial film-forming polymer types: polyesters, acrylics and alkyds. Of the three polymer types, waterborne alkyd resins exhibit significantly higher storage stability and coating stability than the waterborne polyester or acrylic resins. In addition, alkyd resins, due to their low molecular weight, exhibit exceptional film forming ability which translates into very high gloss in the final coating film. Resistance properties are developed, as with traditional solvent-borne alkyds, via autooxidative crosslinking of the alkyd film. However, while alkyd polymers have shown, and continue to show promise, they have relatively slow "dry" and/or cure times, particularly at ambient temperatures. In an attempt to address such concerns, hybrids of waterborne alkyds and relatively high molecular weight acrylic polymers have received considerable attention.

U.S. Pat. No. 4,413,073 describes the preparation of an aqueous dispersion of particles of a film-forming polymer comprising a pre-formed polymer and at least one polymer formed in situ ("multi-polymer particles"). The dispersion is prepared in the presence of an amphipathic stabilizing compound having an HLB of at least 8 and whose lipophilic portion comprises at least one ethylenic unsaturation. The aqueous dispersion is useful as a film-forming component of coating compositions.

U.S. Pat. No. 4,451,596 describes water-dilutable alkyd and acrylate resins for use in water-dilutable lacquer systems. A method for the preparation of water-dilutable resin preparations based upon alkyd and acrylate resins is also described.

European Patent Application 0 555 903 describes a water-dispersible hybrid polymer of an unsaturated fatty acid-functionalized polyester. In addition, aqueous dispersions of such a hybrid polymer for use in aqueous coating compositions with a high solids content and films produced by using such coating compositions are described.

PCT Application WO 95/02019 describes an emulsion of an air-drying resin dispersed in water and the preparation of such emulsions. Hybrid emulsions of an alkyd resin and an acrylate resin are also described.

Previous alkyd/acrylic hybrid latexes have been prepared using alkyds which do not contain metal sulfonate groups. Further, the acrylic polymers of these previous hybrids are either non-reactive or possess reactive groups (e.g. hydroxyl groups) which react, as do similar groups present in the alkyd resin, with aminoplasts such as melamine formaldehyde resins and only at elevated temperatures.

SUMMARY OF THE INVENTION

One aspect of the invention is a water-based latex of an acrylic-modified waterborne alkyd resin. The acrylic-modified waterborne alkyd resin is a hybrid resin resulting from the polymerization of at least one ethylenically unsaturated monomer in the presence of a waterborne alkyd having at least one pendant sulfonate functionality, i.e. a sulfonated waterborne alkyd. The invention also provides a method for preparing such water-based latexes by polymerizing a hybrid resin resulting from the polymerization of at least one ethylenically unsaturated monomer in the presence of a sulfonated waterborne alkyd. The invention further provides coating compositions containing the water-based latexes of the invention.

DETAILED DESCRIPTION OF THE INVENTION

The invention provides a water-based latex of an acrylic-modified waterborne alkyd resin. In one embodiment, the latex affords a stable, emulsion of a hybrid resin resulting from the polymerization of at least one ethylenically unsaturated monomer in the presence of a waterborne alkyd having at least one pendant sulfonate functionality, i.e. a sulfonated waterborne alkyd. In another embodiment, the latex affords a stable, emulsion of a hybrid resin resulting from the polymerization of at least one latent oxidatively-functional (LOF) acrylic monomer in the presence of a waterborne alkyd having at least one pendant sulfonate functionality such that the acrylic monomer retains a sufficient amount of LOF groups for further reaction with other LOF groups or alkyd functionality after or upon film formation. Latexes of the invention are stable when stored at temperatures at or moderately above room temperature. The latex of the invention is capable of affecting crosslinking upon film formation. Such latex films or coatings may be cured at ambient temperature, thermally or photochemically.

In the water-based latexes of the invention, the acrylic-modified waterborne alkyd resin generally exists as particles dispersed in water. The particles are generally spherical in shape. The particles may be structured or unstructured. Structured particles include, but are not limited to, core/shell particles and gradient particles. The core/shell polymer particles may also be prepared in a multilobe form, a peanut shell, an acorn form, or a raspberry form. It is further preferred in such particles that the core portion comprises about 20 to about 80 wt % of the total weight of said particle and the shell portion comprises about 80 to about 20 wt % of the total weight of the particle.

The average particle size of the hybrid latex may range from about 25 to about 500 nm. Preferred particle sizes range from about 50 to about 300 nm, more preferably from about 100 to 250 nm. The hybrid latex particles generally have a spherical shape.

The glass transition temperature ($T_g$) of the acrylic portion of the hybrid resin in accordance with the invention, may be up to about 100° C. In a preferred embodiment of the invention, where film formation of the latex at ambient temperatures is desirable, that glass transition temperature may preferably be under about 70° C., and most preferably between about 0–60° C.

The acrylic-modified waterborne alkyd resins of the invention are prepared by polymerization of at least one ethylenically unsaturated monomer in the presence of a sulfonated waterborne alkyd. If at least one of the ethylenically unsaturated monomers is a latent oxidatively functional (LOF) acrylic monomer, as described below, the acrylic-modified waterborne alkyd resins of the invention will be prepared in the presence of a sulfonated waterborne alkyd such that sufficient latent oxidative functionality of the acrylic monomer survives the polymerization process to enhance crosslinking of the hybrid resin. Any polymerization process known in the art may be used. Preferably an emulsion polymerization process is used since emulsion polymerization allows for the preparation of high molecular weight polymers at low viscosity. The polymerization may take place as a single stage or multi-stage feed. If a multi-stage feed is used, one or more stages may contain an LOF acrylic monomer or mixtures of LOF acrylic monomers. Different LOF monomers may be used in different stages. Copolymers may be used as the acrylic portion of the modified alkyd and may be prepared by copolymerizing other ethylenically unsaturated monomers with the LOF acrylic monomer. The preparation of emulsion polymers of acrylic-modified waterborne alkyd resins containing latent oxidative functionality is one possible solution for a coating composition which crosslinks under a variety of cure conditions, e.g. ambient, thermal, and photochemical.

Sulfonated Waterborne Alkyd Resin

A sulfonated waterborne alkyd resin for use in the water-based latex of the invention may be any waterborne alkyd resin having at least one pendant sulfonate functionality known in the art, including any water-dissipatible, water-dispersible, or water-reducible (i.e. able to get into water) alkyd resin. Examples of such alkyd resins are described in U.S. Pat. No. Nos. 5,378,757 and 5,530,059, both of which are incorporated herein by reference.

Generally sulfonated waterborne alkyd resins may be prepared by reacting a monobasic fatty acid, fatty ester or naturally occurring-partially saponified oil; a glycol or polyol; a polycarboxylic acid; and a sulfomonomer or sulfomonomer adduct containing at least one sulfomonomer group.

The monobasic fatty acid, fatty ester, or naturally occurring-partially saponified oil is preferably selected from the formulae (I), (II), and (III):

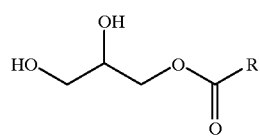
(I)

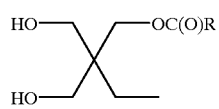
(II)

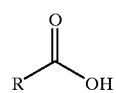
(III)

where the R group is a $C_8$–$C_{20}$ alkyl group. More preferably, the R group is one of the following:

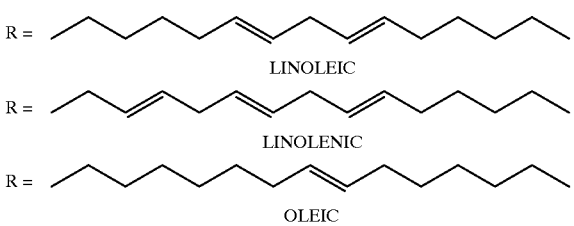

The monobasic fatty acid, fatty ester or naturally occurring-partially saponified oil is preferably prepared by reacting a fatty acid or oil with a polyol. Examples of suitable oils include, but are not limited to, sunflower oil, canola oil, dehydrated castor oil, coconut oil, corn oil, cottonseed oil, fish oil, linseed oil, oiticica oil, soya oil, and tung oil, animal grease, castor oil, lard, palm kernel oil, peanut oil, perilla oil, safflower oil, tallow oil, walnut oil, and the like. Suitable examples of fatty acids alone or as components of oil include, but are not limited to, tallow acid, soya acid, myristic acid, linseed acid, crotonic acid, versatic acid, coconut acid, tall oil fatty acid, rosin acid, neodecanoic acid, neopentanoic acid, isostearic acid, 12-hydroxystearic acid, cottonseed acid, and the like.

The glycol or polyol is preferably selected from aliphatic, alicyclic, and aryl alkyl glycols. Suitable examples of glycols include, but are not limited to, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, glycerine, trimellitic anhydride, pyromellitic dianhydride, dimethylolpropiconic acid, and the like.

The polycarboxylic acid is preferably selected from the group consisting of isophthalic acid, terephthalic acid, phthalic anhydride(acid), adipic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, maleic anhydride, fumaric acid, succinic anhydride (acid), 2,6-naphthalenedicarboxylic acid, glutaric acid and esters thereof.

The sulfonated waterborne alkyd resins useful in the invention preferably have a K value, defined as the total number of moles ($M_r$) of each reactant divided by the total equivalents of acid functionality ($E_a$), of about 1.0 to about 1.5, more preferably of about 1.0 to about 1.25, and an R value, defined as the total equivalents of hydroxyl functionality ($E_{OH}$) divided by the total equivalents of acid functionality ($E_a$), of about 1.0 to about 2.0, more preferably of about 1.0 to about 1.5.

The K value is a measure of a resin's molecular weight which increases as the K value decreases to 1.00. Since higher molecular weight resins are better, K values that are closer to 1.00 are most preferred. The R value is proportional to the excess equivalents of hydroxyl functionality used in the resin synthesis. An excess of hydroxyl functionality is preferred, however this excess should not be so high as to render the resulting coating water sensitive.

The sulfomonomer of the sulfomonomer adduct is either a difunctional or a monofunctional monomer containing a —$SO_3M$ group attached to an aromatic nucleus where M is hydrogen or a metal ion such as, for example, $Na^+$, $Li^+$, $K^+$, $Ca^{2+}$, $Cu^{2+}$, $Fe_{2+}$, or $Fe_{3+}$. The sulfomonomer as a difunctional monomer component may be a dicarboxylic acid (or a derivative thereof) containing a —$SO_3M$ group where M is as defined above. Suitable examples of the aromatic nucleus to which the —$SO_3M$ group may be attached include, but are not limited to, benzene, naphthalene, anthracene, diphenyl, oxydiphenyl, sulfonyl-diphenyl, and methylenediphenyl.

Especially good results are obtained when the difunctional monomer is a sodium salt of a sulfoisophthalic acid, a sulfoterephthalic acid, a sulfophthalic acid, a 4-sulfo-naphthalene-2,7-dicarboxylic acid or a derivative thereof. More preferably, the difunctional monomer is 5-sodiosulfoisophthalic acid or a derivative such as dimethyl 5-sodiosulfoisophthalate. Other preferred difunctional monomers are lithium 5-sulfoisophthalic acid, dimethyl lithium 5-sulfoisophthalate, potassium 5-sulfoisophthalic acid, and dimethyl potassium 5-sulfoisophthalate.

Other effective difunctional monomers containing a —$SO_3M$ group attached to an aromatic nucleus include metal salts of aromatic sulfonic acids or their respective esters of the formula

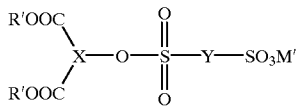

(IV)

wherein X is a trivalent aromatic hydrocarbon radical, Y is a divalent aromatic hydrocarbon radical, R' is hydrogen or an alkyl group of one to four carbon atoms, M' is hydrogen $Na^+$, $Li^+$, or $K^+$. Examples of preferred monomers of formula (IV) include, but are not limited to, 4-sodiosulfophenyl-3,5-dicarbomethoxybenzenesulfonate, 4-lithiosulfophenyl-3,5-dicarbomethoxybenzenesulfonate and 6-sodiosulfo-2-naphthyl-3,5-dicarbomethoxybenzenesulfonate.

Still other effective difunctional monomers containing a —$SO_3M$ group attached to an aromatic nucleus include metal salts of sulfodiphenyl ether dicarboxylic acids or esters thereof of the formula (V):

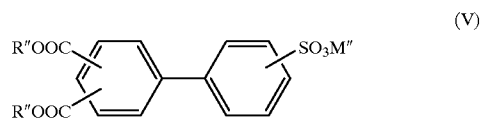

(V)

wherein R" is hydrogen, an alkyl group of one to eight carbon atoms, or phenyl and M" is hydrogen, $K^+$, $Na^+$, or $Li^+$. Examples of preferred monomers include, but are not limited to, dimethyl 5-[4-(sodiosulfo)phenoxy]isophthalate, dimethyl 5-[4-(sodiosulfo)phenoxy]terephthalate, and 5-[4-(sodiosulfo)phenoxy]isophthalic acid. Additional examples of such monomers are disclosed in U.S. Pat. No. 3,734,874, incorporated herein by reference.

The type and amount of metal sulfonate selected for water dispersability can be varied to obtain useful ion-containing alkyd resins. As little as 2 mole percent based on total carboxylic acid content will impart a significant degree of water miscibility, however, at least 3 percent is preferred. Water-soluble polyesters can be formulated with as much as 20 mole percent of the metal sulfonate. However, a practical upper limit based on the amount of branch-inducing intermediate required to counteract the water sensitivity effects is 9 percent, preferably 6 percent.

Metal sulfonates that are most preferred include 5-sodiosulfoisophthalic acid, dimethyl 5-sodiosulfoisophthalate, lithium 5-sulfoisophthalic acid, dimethyl lithium 5-sulfoisophthalate, potassium 5-sulfoisophthalic acid, dimethyl potassium 5-sulfoisophthalate, 3-sodiosulfobenzoic acid and the like.

Optionally, the sulfomonomer containing at least one sulfonate group that may be reacted with a polyol to produce a polyol (e.g. a diol) sulfomonomer adduct may be a monofunctional sulfomonomer containing at least one sulfonate group that may be reacted with a polyol containing at least three hydroxyl groups. The monofunctional sulfomonomer is preferably selected from the following group of sulfomonomers:

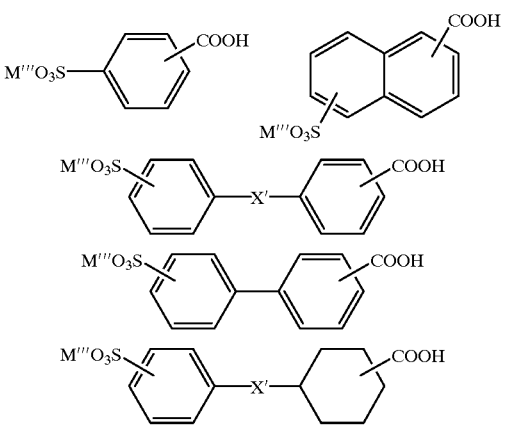

where X' is $CH_2$, $SO_2$, or O and M''' is an alkaline or alkaline earth metal.

When the polyol sulfomonomer adduct is prepared by reacting a difunctional sulfomonomer with a polyol, the polyol is preferably a diol. Suitable examples of diols include those described above with the following diols being more preferred: ethylene glycol, diethylene glycol, 2,2,4-trimethyl-1,3-pentanediol, 1,4-cyclohexanedimethanol, 1,3-cyclohexanedimethanol, hydroxypivalyl hydroxypivalate, dipropylene glycol, 1,6-hexanediol, 1,10-decanediol, 1,3- butanediol, hydrogenated bisphenol A, 1,4-butanediol and neopentyl glycol.

In addition to the amount of polyol reacted with the fatty acid, fatty ester or naturally occurring-partially saponified oil according to the preferred step, and in addition to the polyol used in the preparation of the sulfomonomer adduct from a monofunctional sulfomonomer, an additional amount of a polyol or other branching agent such as a polycarboxylic acid may be used to increase the molecular weight and branching of the waterborne alkyd resin. These branching agents are preferably selected from trimethylolethane, pentaerythritol, erythritol, threitol, dipentaerythritol, sorbitol, glycerine, trimellitic anhydride, pyromellitic dianhydride, dimethylolpropionic acid, and trimethylolpropane.

In order for the alkyd resin to serve as a reactive filming aid (via oxidative coupling) in a hybrid latex and become incorporated into the crosslinked polymer film, it is preferred that the alkyd have some finite oil length—long, medium or short. The finite oil length or oil content is generally between about 20 wt % and about 90 wt % in the alkyd composition based on the total weight of the alkyd resin. A "long" oil alkyd has an oil length or oil content of about 60–90 wt % based on the total weight of the alkyd resin. A "medium" oil alkyd has an oil content of about 40–60 wt % based on the total weight of the alkyd resin. A "short" oil alkyd has an oil length or oil content of about 20–40 wt % based on the total weight of the alkyd resin.

Ethylenically Unsaturated Monomer

The acrylic portion of the acrylic-modified waterborne alkyd resin may be prepared by free radical polymerization of at least one ethylenically unsaturated monomer in the presence of a sulfonated waterborne alkyd as described above. Examples of suitable ethylenically unsaturated monomers include, but are not limited to, styrenic monomers such as styrene, α-methyl styrene, vinyl naphthalene, vinyl toluene, chloromethyl styrene and the like; ethylenically unsaturated species such as, for example, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, glycidyl methacrylate, carbodiimide methacrylate, alkyl crotonates, vinyl acetate, di-n-butyl maleate, di-octylmaleate, and the like; and nitrogen containing monomers including t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl) ethylene urea, and methacrylamidoethylethylene urea. Other examples of suitable ethylenically unsaturated monomers include, but are not limited to, ethylenically unsaturated monomers which possess at least one latent oxidative functionality (LOF). Preferably, at least one of the ethylenically unsaturated monomers polymerized with the sulfonated waterborne alkyd possesses latent oxidative functionality (LOF).

The LOF group may be any pendant moiety which is capable of (i) surviving the polymerization process and (ii) participating in or promoting oxidative crosslinking of the modified alkyd. After polymerization of the LOF acrylic monomer, a modified alkyd of the invention possesses sufficient LOF groups to increase or amplify the degree of crosslinking normally found in acrylic modified waterborne alkyd resins which contain no LOF groups. In other words, sufficient LOF groups remain to increase or enhance the effective crosslinking of the hybrid resin.

The presence of a LOF group on the modified alkyd makes crosslinking possible upon or after film formation. With a modified alkyd of the invention, crosslinking may occur between LOF groups of acrylic monomer(s), between a LOF group of an acrylic monomer and a ethylenically unsaturated functionality of the alkyd, or between ethylenically unsaturated functionalities of the alkyd. Capable of undergoing an oxidative reaction, the LOF group participates in or promotes oxidative crosslinking as a source of free radicals to generate a free-radical flux. Preferably the LOF group is an ethylenic unsaturation such as, but not limited to, allyl and vinyl groups. The LOF group may also preferably be an acetoacetyl moiety or enamine moiety. Preparation of enamines from acetoacetyl groups are described in U.S. Pat. Nos. 5,296,530, 5,494,975, and 5,525,662 which are incorporated here by reference.

Examples of acrylic monomers having latent oxidatively-functional (LOF) groups include, but are not limited to, allyl methacrylate, vinyl methacrylate, acetoacetoxyethyl methacrylate, hydroxybutenyl methacrylate, the allyl or diallyl ester of maleic acid, poly(allyl glycidyl ether) and the like.

Water-based Latexes

A water-based latex of the invention is prepared by the polymerizing at least one ethylenically unsaturated monomer in the presence of an aqueous dispersion of a waterborne alkyd having at least one pendant sulfonate functionality. A water-based latex of the invention is stable at the same pHs (pH>7) as latexes prepared from traditional waterborne alkyds.

However, unlike hybrid latexes of traditional waterborne alkyds, the sulfonated waterborne alkyd based hybrid latexes of the invention are also stable at pH≦7, even as low as pH 4.0–4.5. In the water-based latex of the invention, the modified alkyd generally exists as particles in water. As discussed above, if monomers which contain LOF groups are included in the acrylic portion of the hybrid resin, sufficient LOF groups remain after the polymerization process to enhance oxidative crosslinking of films formed from the resulting water-based alkyd latex. Since the LOF group functions to increase the effective crosslinking of the alkyd, post-polymerization survival of sufficient LOF groups not only allows for their coreactivity with other LOF groups and/or waterborne alkyd functionality upon or after film formation but may also promote similar oxidative crosslinking between waterborne alkyd functionalities. As a result of such coreactivity between LOF groups and/or alkyd functionalities, film properties such as, for example, solvent resistance can be improved.

As discussed above, the ethylenically unsaturated monomer may be added either as a mixture of at least one ethylenically unsaturated monomer or as a mixture of at least one ethylenically unsaturated monomer and an LOF acrylic comonomer. Addition of an ethylenically unsaturated monomer is conducted in a one-stage or multiple-stage (e.g. core-shell) process. Preferably, the ethylenically unsaturated monomer is added in a one-stage process. In cases where a LOF acrylic monomer is desired, addition of the LOF acrylic monomer or monomers in a one-stage process results in a homogeneous acrylic polymer (i.e., simple terpolymer) which contains a sufficient number of LOF groups (e.g. allyl, vinyl) capable of reacting with other LOF groups or alkyd functionality upon or after film formation or promoting reaction between functionalities on the alkyd. Addition of the LOF acrylic monomer in a multiple-stage process produces a heterogeneous acrylic polymer. For example, in a two-stage process, the first stage of the addition may produce a core polymer of preferably an acrylic or styrene/ acrylic polymer which is often pre-crosslinked with a multifunctional monomer such as trimethylolpropane triacrylate. The second stage of the addition produces a shell polymer of preferably a styrene/acrylic polymer which contains a high level of LOF groups, such as reactive allyl and/or vinyl moieties. Monomers for use in such one- or multiple-stage polymerization processes are described in U.S. Pat. No. 5,539,073 incorporated here by reference. The LOF groups may be located at the termini of polymer as well as along the polymer backbone.

As discussed above, preferably the water-based latex of the invention is prepared under emulsion polymerization conditions. In general, upon emulsion polymerization of the LOF acrylic polymer compositions, it is primarily the ethylenic unsaturation moiety of the acrylic that undergoes polymerization and not the LOF group. If the LOF group participates in the polymerization, polymerization conditions are such that enough LOF groups survive in order to oxidatively crosslink with other LOF groups and/or waterborne alkyd functionality and/or to enhance oxidative crosslinking between waterborne alkyd functionalities upon or after film formation. Survival of LOF groups, such as allyl or vinyl moieties, upon polymerization can be achieved by manipulating the differences in reactivity of the ethylenically unsaturated groups. For example, the ethylenically unsaturated acrylic moiety of an allyl or vinyl functionalized acrylic monomer has greater reactivity upon polymerization with styrenic monomers than the LOF allyl or vinyl moiety. As a result, the resulting polymer contains LOF groups. A description of manipulation of allyl functionalized acrylic polymer compositions to promote survival of the allyl moiety upon emulsion polymerization may be found in U.S. Pat. No. 5,539,073 which is incorporated herein by reference. Vinyl functionalized acrylic polymer compositions may be manipulated in a manner similar to that applied to allyl functionalized acrylic polymer compositions.

When the LOF group of the acrylic polymer is an acetoacetoxy moiety, under emulsion polymerization conditions it is the ethylenically unsaturated moiety which polymerizes. The acetoacetoxy moiety is unaffected by, and thus survives, the polymerization process.

The polymerization process by which the hybrid latexes are made may also require an initiator, a reducing agent, or a catalyst. Suitable initiators include conventional initiators such as ammonium persulfate, ammonium carbonate, hydrogen peroxide, t-butylhydroperoxide, ammonium or alkali sulfate, di-benzoyl peroxide, lauryl peroxide, di-tertiarybutylperoxide, 2,2'-azobisisobuteronitrile, benzoyl peroxide, and the like.

Suitable reducing agents are those which increase the rate of polymerization and include, for example, sodium bisulfite, sodium hydrosulfite, sodium formaldehyde sulfoxylate, ascorbic acid, isoascorbic acid, and mixtures thereof.

Suitable catalysts are those compounds which promote decomposition of the polymerization initiator under the polymerization reaction conditions thereby increasing the rate of polymerization. Suitable catalysts include transition metal compounds and driers. Examples of such catalysts include, but are not limited to, ferrous sulfate heptahydrate, ferrous chloride, cupric sulfate, cupric chloride, cobalt acetate, cobaltous sulfate, and mixtures thereof.

Optionally, a conventional surfactant or a combination of surfactants may be used as a costabilizer or cosurfactant, such as an anionic or non-ionic emulsifier, in the suspension or emulsion polymerization preparation of a hybrid latex of the invention. Examples of preferred surfactants include, but are not limited to, alkali or ammonium alkylsulfate, alkylsulfonic acid, or fatty acid, oxyethylated alkylphenol, or any combination of anionic or non-ionic surfactant. A more preferred surfactant monomer is HITENOL HS-20 (which is a polyoxyethylene alkylphenyl ether ammonium sulfate available from DKS International, Inc. of Japan). A list of suitable surfactants is available in the treatise: McCutcheon's Emulsifiers & Detergents, North American Edition and International Edition, MC Publishing Co., Glen Rock, N.J., 1993. Preferably a conventional surfactant or combination of surfactants is used when the alkyd portion of the hybrid resin represents up to about 35 wt %, generally about 5–20 wt % of the total solids of the latex.

If the resulting hybrid latex is formulated with drier salts typically used in alkyd coatings and LOF moieties are present in the acrylic portion of the hybrid, significant improvements in, among other properties, latex gel fraction and swell ratio (LGF and LSR, respectively) and solvent resistance are observed. While the alkyd portion of the hybrid latex plays an important role in both stabilizing the latex and improving film formation, it is the presence of the LOF acrylic portion of the hybrid that can improve certain physical and mechanical film properties. The improved properties are typically those which are related to higher crosslink density than that observed for hybrid resins containing non-LOF acrylics.

In general, the alkyd portion of the hybrid latex represents about 5–60 wt %, preferably about 10–50 wt %, more preferably about 20–40 wt % of the total solids of the latex while the acrylic portion of the hybrid latex represents about 30–90 wt %, preferably about 50–80 wt %, more preferably about 60–80 wt % of the total solids of the latex. Such hybrid latexes can be further used in coating compositions.

A coating composition of the invention contains a latex of an acrylic-modified waterborne alkyd dispersion of the invention and may be prepared by techniques known in the art, e.g. as disclosed in U.S. Pat. Nos. 4,698,391, 4,737,551, and 3,345,313, each of which is incorporated herein by reference in their entirety. Examples of such coating compositions include, for example, architectural coatings, maintenance coatings, industrial coatings, automotive coatings, textile coatings, inks, adhesives, and coatings for paper, wood, and plastics. Coating compositions of the invention contain significantly less solvent, less than 25 wt % to as low as 1 wt % and even zero VOC content. The waterborne alkyd portion of the hybrid resin retains the desirable properties of an alkyd while the acrylic portion of the resin improves the hardness and durability of the hybrid alkyd resin. When an LOF acrylic monomer is used, the LOF portion of the acrylic resin compliments or enhances the oxidative crosslinking ability of the hybrid alkyd resin at ambient temperature. The coating compositions of the invention produce coatings that have high gloss, fast cure, and good acid and caustic resistance.

The coating composition may be coated onto a substrate and cured using techniques known in the art (e.g. by spray-applying 3 to 4 mils of wet coating onto a metal panel, and heating in a 150° C. forced air oven for 30 minutes). The substrate can be any common substrate such as paper, polyester films such as polyethylene and polypropylene, metals such as aluminum and steel, glass, urethane elastomers and primed (painted) substrates, and the like. The coating composition of the invention may be cured at room temperature (ambient cure), at elevated temperatures (thermal cure), or photochemically cured.

A coating composition of the invention may further contain coating additives. Examples of such coating additives include, but are not limited to, one or more leveling, rheology, and flow control agents such as silicones, fluorocarbons or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives and emulsion polymerization methodology may be found in U.S. Pat. No. 5,371,148, incorporated herein by reference.

Examples of flatting agents include, but are not limited to, synthetic silica, available from the Davison Chemical Division of W. R. Grace & Company under the SYLOID® tradename; polypropylene, available from Hercules Inc. under the HERCOFLAT® tradename; and synthetic silicate, available from J. M. Huber Corporation under the ZEOLEX® tradename.

Examples of dispersing agents and surfactants include, but are not limited to, sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetra-sodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. under the ANTI TERRA® tradename. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, hydroxypropyl methyl cellulose, ethyl hydroxyethyl cellulose, polyethylene oxide, guar gum and the like. Other examples of thickeners include the methylene/ethylene oxide associative thickeners and water soluble carboxylated thickeners such as, for example, UCAR POLYPHOBE® by Union Carbide.

Several proprietary antifoaming agents are commercially available and include, for example, BUBREAK® of Buckman Laboratories Inc., BYK® (of BYK Chemie, U.S.A., FOAMASTER® and NOPCO® of Henkel Corp./Coating Chemicals, DREWPLUS® of the Drew Industrial Division of Ashland Chemical Company, TRYSOL® and TROYKYD® of Troy Chemical Corporation, and SAG® of Union Carbide Corporation.

Examples of fungicides, mildewcides, and biocides include, but are not limited to, 4,4-dimethyloxazolidine, 3,4,4-trimethyloxazolidine, modified barium metaborate, potassium N-hydroxy-methyl-N-methyldithiocarbamate, 2-(thiocyano-methylthio)benzothiazole, potassium dimethyl dithiocarbamate, adamantane, N-(trichloromethylthio) phthalimide, 2,4,5,6-tetrachloro-isophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include among others substituted benzophenone, substituted benzotriazoles, hindered amines, and hindered benzoates, available from American Cyanamid Company under the CYASORB UV® tradename, and diethyl-3-acetyl-4-hydroxy-benzyl-phosphonate, 4-dodecyloxy-2-hydroxy benzophenone, and resorcinol monobenzoate.

Examples of solvents and coalescing agents are well known and include but are not limited to ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, TEXANOL® ester alcohol (Eastman Chemical Company), and the like. Such solvents and coalescing aids may also include reactive solvents and coalescing aids such as diallyl phthalate, SANTOLINK XI-100® (polyglycidyl allyl ether from Monsanto, and others as described in U.S. Pat. Nos. 5,349,026 and 5,371,148, incorporated herein by reference.

Pigments suitable for use in the coating compositions envisioned by the invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to, the following: titanium dioxide, barytes, clay, or calcium carbonate, CI Pigment White 6 (titanium dioxide); CI Pigment Red 101 (red iron oxide); CI Pigment Yellow 42; CI Pigment Blue 15, 15:1, 15:2, 15:3, 15:4 (copper phthalocyanines); CI Pigment Red 49:1; and CI Pigment Red 57:1. Colorants such as phthalocyanine blue, molybdate orange, or carbon black are also suitable for the coating compositions of the invention.

The following examples are given to illustrate the invention. It should be understood, however, that the invention is not to be limited to the specific conditions or details described in these examples.

The examples of various coating compositions of the invention use the following materials not described above:

ACRYSOL 1020 associative thickener sold by Rohm and Haas, Philadelphia, Pa.

ACTIV 8 accelerator sold by R. T. Vanderbilt, Inc., Norwalk, Conn.

AQUACAT and MAGNACAT driers sold by Ultra Additive, Paterson, N.J.

BYK-024 dispersant sold by BYK-Chemie, Cleveland, Ohio

COBALT HYDROCURE II drier, ZIRCONIUM HYDROCEM drier, and DRI-RX-HF accelerator sold by OMG, Cleveland, Ohio Dibutyl phthalate plasticizer sold by Eastman Chemical Company, Kingsport, Tenn.

EASTMAN EB and EASTMAN DB coalescents [co-solvent] sold by Eastman Chemical Company, Kingsport, Tenn.

FASCAT 4100 an esterification catalyst, sold by M&T Chemicals, Rahway, N.J.

HEXYL CARBITOL co-solvent sold by Union Carbide Corporation, Danbury, Conn.

KELSOL 3960-B2G-75 water reducible alkyd sold by Reichhold Chemical, Research Triangle Park, N.C.

PAMOLYN 200 a tall oil fatty acid, sold by Hercules Incorporated, Wilmington, Del.

PATCOTE 519 and 577 defoamers sold by American Ingredients Company, Kansas City, Mo.

RHOPLEX WL-51 latex sold by Rohm & Haas, Philadelphia, Pa.

SURFYNOL 104, 104PA and 465 surfactants, sold by Air Products and Chemicals, Inc., Allentown, Pa.

TAMOL 165 and TRITON CF-1 dispersants sold by Rohm & Haas, Philadelphia, Pa.

TERGITOL 15-S-40 surfactant sold by Union Carbide Chemical and Plastics Co., Danbury, Conn.

TIPURE R-706 pigment and R-746 slurry sold by DuPont Chemicals, Wilmington, Del.

The following methods were used to evaluate the coatings and films prepared according to the invention.

Film Gel Fraction/Swell Ratio

Film swell ratios (FSR) were obtained by determining the ratio of insoluble polymer weight fraction swollen in acetone (by weight) to dry weight of the insoluble weight fraction in a dry film sample.

The procedure used is as follows: for each sample determination, a 4"×4"325-mesh steel screen and a metal weighing boat are baked in the oven, cooled for 30 minutes and weighed (W1 and W2, respectively). After the latex film is dried and kept for the required number of days at room temperature, a piece of the film is cut, weighed (W3), placed in an aluminum pan, and put aside. Another film sample is cut, weighed (W4) and placed in a screw cap jar with excess solvent on a shaker bath for 16 hours at constant temperature. The film gel is recovered by pouring the solution plus wet solids through the screen and weighing the screen plus retained wet solids (W5). At this point the screen plus solids and the film sample are dried in the aluminum boat in a vacuum oven at 80° C. to constant weight and the weight for the screen plus dry solids (W6) and the film sample in the aluminum boat (W7) obtained. Calculations are shown below.

FGF=(W6-W1)/[W4((W7-W2)/W3)] FSR=(W5-W1)/(W6-W1)

Paint Viscosity:

Paint viscosity (in Krebs Units) was measured after 24 hours using a Krebs-Stormer viscometer.

Methyl Ethyl Ketone Resistance

Methyl Ethyl Ketone (MEK) Resistance was reported as MEK double rubs (one set of back and forth). MEK rubs were measured by securing multiple layers of cheesecloth over the round head of a 16 ounce ball pin hammer. The hammer is then attached to a mechanical device which moves the hammer back and forth. The cheesecloth is saturated with MEK, the panel is rubbed with the soaked cloth to the point of first breakthrough to the substrate.

Pendulum Hardness

Pendulum hardness was measured using a Gardner Pendulum Hardness Tester.

Tukon Hardness

Tukon Hardness was determined according to ASTM D1474-92.

Surface Tack

Surface Tack was determined by applying firm finger pressure for 10 second. The ratings are as follows:

0-will not release
3-tacky
4-slight tack
5-no tack

EXAMPLE 1

Preparation and Dispersion of Water-Dispersible Sulfonated Alkyd Resin

Step 1: An adduct of neopentyl glycol (NPG) and 5-sodiosulfoisophthalic acid (SIP) was first prepared by reacting NPG (2483.5 g, 23.88 mol); SIP (93.3%) (1608.5 g, 5.6 mol); distilled water (276.0 g); and the catalyst, FASCAT 4100 (3.3 g) in a three-neck, round bottom flask equipped with a mechanical stirrer, a steam-jacketed partial condenser, a Dean-Stark trap, a nitrogen inlet, and a water condenser. The reaction temperature was gradually increased from 130° C. to 190° C. in a period of five hours and the condensate (water) collected in a Dean-Stark trap. The reaction was allowed to continue until an acid number of 3 was obtained. A portion of the resultant product was used in the following step.

Step 2: Into a three-neck, round-bottom flask (3L) equipped with the same configuration as above were charged the NPG/SIP adduct (497.0 g); phthalic anhydride (PA) (357.4 g, 2.42 mol); pentaerythritol (PE) (233.8 g, 1.72 mol); PAMOLYN 200 (tall oil fatty acid) (985.9 g, 3.40 mol); and FASCAT 4100 (1.54 g). The reaction temperature was gradually increased to 230° C. in one hour. The reaction was allowed to continue for about three more hours until an acid number of 8 was obtained. The resulting resin was allowed to cool and subsequently isolated.

Preparation of Aqueous Dispersion: The viscous resin from Step 2 was warmed to 80° C. in an oven and subsequently charged (100 g) into a flask equipped with a water condenser. The resin was heated to 120° C. and stirred under a nitrogen atmosphere. The resulting resin melt was allowed to cool to 80° C. and distilled water (100 g) was added dropwise. During the dispersing process, the temperature was further reduced to 50° C. when a homogeneous resin solution was obtained. The stirring was allowed to continue and additional water (22 g) added to give an aqueous resin with 45% solids.

EXAMPLES 2–9

Preparation of Latexes by Emulsion Polymerization of Alkyd/Heterogeneous LOF Acrylic Hybrid Resins For each of EXAMPLES 2–9, to a 1000 mL resin kettle equipped with a condenser, nitrogen purge, and a subsurface feed tube were added water and the alkyd dispersion from Example 1 (Table 1). A nitrogen purge was begun, then the contents of the reactor brought up to 80° C., an initiator charge composed of 0.15 g of ammonium persulfate dissolved in 5.0 g of water was added to the reactor. The acrylic first stage monomer or core composition feed was then begun and fed over approximately 70 mins. Simultaneously, an initiator feed composed of 0.51 g of ammonium persulfate and 0.66 g of ammonium carbonate dissolve in 33.0 g of water was begun and fed at 0.22 g/min. After the first stage monomer feed was completed, the reaction was held for 30 mins at 80° C. with continued addition of the initiator solution. After the hold period, the acrylic second stage monomer or shell composition feed was begun and fed over approximately 50 mins. After all of the feeds were completed, hearing at 80° C. was continued for 60–90 mins. The emulsion was then cooled, filtered through a 100 mesh wire screen, and filterable solids or scrap collected. The particle size, viscosity and pH of the resulting alkyd/heterogeneous acrylic hybrid resin latexes were determined and summarized in Table 1.

EXAMPLE 10

Preparation of Latex by Emulsion Polymerization of Alkyd/Homogeneous Acrylic Hybrid Resin-Control To a 1000 mL resin kettle equipped with a condenser, nitrogen purge, and a subsurface feed tube were added 122.1 g of water and 204.4 g of the alkyd dispersion from Example 1. A nitrogen purge was begun, then the contents of the reactor brought up to 80° C. at 300 rpm. Next an initiator charge composed of 0.15 g of ammonium persulfate dissolved in 5.0 g of water was added to the reactor. A monomer feed composed of 38.5 g of 2-ethylhexyl acrylate, 61.3 g of styrene, and 30.7 g of methyl methacrylate was begun and fed over approximately 135 mins. Simultaneously, an initiator feed composed of 0.51 g of ammonium persulfate and 0.66 g of ammonium carbonate dissolved in 33.0 g of water was begun and fed at 0.22 min. After all of the feeds were completed, heating at 80° C. was continued for 60–90 mins. The emulsion was then cooled and filtered through a 100 mesh wire screen. The particle size, viscosity and pH of the resulting hybrid latex were determined and summarized in Table 1.

EXAMPLE 11

Cure Studies on Clear Films using a Cobalt/Zirconium Drier Package as Crosslinking Catalysts For each latex of Examples 2–10, to 30 grams of latex was added 4.3 g of water (to reduce solids to 35%), 0.24 g of Cobalt HYDROCURE II and 0.50 g of Zirconium Hydrochem. Samples were stirred overnight, then cast over release paper (15 mils wet) and air dried at room temperature.

Film gel fractions (FGF) were obtained by determining the insoluble weight fraction of polymer in a dry film sample. Average values were determined from triplicate measurements and are summarized in Table 2.

Both the non-functional control (Example 10) and those hybrid latexes which contain either allylic or vinyl functionality in the shell (Examples 2–8) appear to reach a plateau in film gel fraction of 75–80% at 21 days. It is believed that this apparent independence of ultimate gel fraction on acrylic composition is related in fact to the composition of the alkyd—specifically to the relatively low level of tall oil fatty acid (TOFA) in the alkyd. At lower levels of TOFA, the average number of reactive groups per alkyd molecule may be so low that statistically, there are alkyd molecules which are essentially non-reactive and do not, therefore, become part of the crosslinked matrix. However, the allyl/vinyl functional latexes of this invention do offer significant improvements in film gel fraction at shorter cure times (e.g. 7 days). In fact, the average 7-day film gel fraction of the allyl/vinyl functional hybrids is 76.2±2.1% —considerably higher than the 62.4% observed for the non-functional Example 10.

Film swell ratios indicate that though some fraction of the hybrid latex (perhaps the alkyd as described above) is not incorporated into the crosslinked film, that fraction which does crosslink continues to do so with time—resulting in a continual lowering of the film swell ratio. Furthermore, the film swell ratios determined for the allyl/vinyl functional latexes are significantly lower at both 7 and 21 days than those determined for the non-functional control. This further suggests the importance of having functionality in the acrylic portion of an alkyd/acrylic hybrid.

Comparison of film swell ratios for Examples 1, 3 and 4 demonstrate the effect of alkyd content in the alkyd/acrylic hybrid on the rate of oxidative crosslinking of the hybrid films. While film gel fractions are quite similar for these three hybrids, final film swell ratios and perhaps more importantly, the percent change in film swell ratios from 7 to 21 days indicate that LOWER levels of alkyd yield more densely and/or rapidly crosslinked films. This further demonstrates that having a latent oxidatively-functional (LOF) acrylic as a component of the alkyd/acrylic hybrid can significantly enhance the rate/extent of crosslinking of the hybrid film.

Example 9 is not, strictly speaking, an allyl/vinyl functional alkyd/acrylic hybrid. The reactive monomer in this latex is acetoacetoxyethyl methacrylate (AAEM), as opposed to allyl methacrylate (ALMA) or vinyl methacrylate (VMA). It is well known that at the amine-neutralized pH of this latex (pH<8.0), acetoacetoxy functionality will form oxidatively reactive enamine groups which could, as would ALMA or VMA, react with the oxidative functionality of the alkyd dispersion. In fact film gel fraction and swell ratio measurements indicate that the enamine functionality associated with AAEM crosslinks much more rapidly than does either the ALMA or VMA chemistry. Advantageously, the survival of the AAEM functionality in the polymerization process is not nearly as sensitive to polymer composition, particularly styrene level, as are ALMA and VMA.

TABLE 1

| Ex. | wt % alkyd | core composition (wt %) MMA/S/EHA/TMPTA | shell composition (wt %) S/EHA/ALMA/VMA/AAEM[1] | core/shell ratio | Particle Size (nm) | Visc (cps) | Scrap (gm) | pH |
|---|---|---|---|---|---|---|---|---|
| 2 | 35 | 0.0/70.0/29.5/0.5 | 55.8/23.6/14.3/0/0 | 1.70 | 195 | 48 | 0.08 | 8.2 |
| 3 | 35 | 35.0/35.0/29.5/0.5 | 55.8/23.6/14.3/0/0 | 1.70 | 298 | 628 | 0.06 | 8.1 |
| 4 | 35 | 70.0/0.0/29.5/0.5 | 55.8/23.6/14.3/0/0 | 1.70 | 246 | 90 | 0.22 | 8.1 |
| 5 | 20 | 35.0/35.0/29.5/0.5 | 55.8/23.6/14.3/0/0 | 1.70 | 296 | 17 | 2.04 | 8.3 |
| 6 | 50 | 35.0/35.0/29.5/0.6 | 55.8/23.6/14.3/0/0 | 1.70 | 152 | 204 | 0.09 | 8.0 |
| 7 | 35 | 35.0/35.0/29.5/0.7 | 55.8/23.6/0/14.3/0 | 1.70 | 341 | 6410 | 0.00 | 8.2 |
| 8 | 35 | 35.0/35.0/29.5/0.8 | 55.8/23.6/7.2/7.1/0 | 1.70 | 338 | 5110 | 0.00 | 8.2 |
| 9 | 35 | 35.0/35.0/29.5/0.9 | 55.8/23.6/0/0/14.3 | 1.70 | 371 | — | 0.00 | 8.1 |
| 10 | 35 | 47.0/23.5/29.5* | — | — | 146 | 625 | 0.06 | 8.0 |

*corresponds to overall composition of core-shell latexes in Examples 2–9 without LOF monomer(s)
[1]all shell compositions contain 6.3 wt % N,N-dimethylaminoethyl methacrylate
all latexes prepared at 40.0% solids
MMA-methyl methacrylate; S-styrene; EHA-ethylhexyl acrylate; TMPTA-trimethylolpropane triacrylate; ALMA-ally methacrylate; VMA-vinyl methacrylate; AAEM-acetoacetoxyethyl methacrylate

TABLE 2

| Ex | 7-day FGF | 21-day FGF | % Increase in FGF | 7-day FSR | 21-day FSR | % Decrease in FSR |
|---|---|---|---|---|---|---|
| 2 | 0.762 | 0.800 | 5.0 | 3.494 | 2.026 | 42.0 |
| 3 | 0.754 | 0.761 | 0.9 | 3.198 | 2.523 | 21.1 |
| 4 | 0.766 | 0.765 | −0.1 | 3.904 | 3.229 | 17.3 |
| 5 | 0.785 | 0.817 | 4.1 | 4.322 | 2.608 | 39.7 |
| 6 | 0.719 | 0.731 | 1.7 | 3.454 | 3.397 | 1.7 |
| 7 | 0.781 | — | — | 3.512 | — | — |
| 8 | 0.766 | 0.782 | 2.1 | 3.662 | 3.321 | 9.3 |

TABLE 2-continued

| Ex | 7-day FGF | 21-day FGF | % Increase in FGF | 7-day FSR | 21-day FSR | % Decrease in FSR |
|---|---|---|---|---|---|---|
| 9 | 0.898 | — | — | 2.623 | — | — |
| 10 | 0.624 | 0.769 | 23.2 | 5.383 | 4.156 | 22.8 |

FGF -Film Gel Fraction; FSR - Film Swell Ratio

EXAMPLE 12

Preparation of Water-Dispersible Sulfonated Alkyd Resins

Following the procedure described in Example 1, two other water-dispersible sulfonated alkyd resins were prepared which contained, respectively, 0.63 and 1.29 times the amount of tall oil fatty acid (PAMOLYN 200) as was used in Example 1. Example 1 and these two materials were designated medium, short, and long oil alkyds, respectively. The alkyd dispersion process for these three samples was modified slightly to include the addition of 12% hexyl carbitol (based on weight of alkyd) to the alkyd resin prior to the addition of the water.

EXAMPLES 13–23

Preparation of Latexes Containing Alkyd/Acrylic Hybrids

Using the alkyd dispersions prepared in Example 12, a series of latexes containing alkyd/acrylic hybrids were prepared with different types of LOF groups, different types and levels of the alkyds resins, and different acrylic $T_g$'s. A general procedure for the preparation of these materials is as follows: To a 500 mL reactor, appropriate amounts of demineralized water and alkyd dispersion were added. These reactor contents were heated to 80 ° C., at which time an initiator charge consisting of 0.22 g ammonium persulfate in 5.0 g water were added to the reactor. A mixture of monomers, as described below in Table 3 for each sample, was then fed into the reactor over a period of three hours while simultaneously feeding a solution of 0.22 g ammonium persulfate and 0.31 g ammonium carbonate in 30 g water. Following the addition of all of the components to the reactor, the 40% solids latex was held at 80° C. for approximately one hour, cooled to room temperature, and filtered.

TABLE 3

| Sample | wt % alkyd[1] | alkyd oil length | acrylic $T_g^2$ ° C. | styrene wt % | 2EHA wt % | LOF acrylic monomer[3] | wt % |
|---|---|---|---|---|---|---|---|
| 13 | 35 | short | 10 | 46 | 44 | ALMA | 10 |
| 14 | 40 | short | 30 | 58 | 32 | VMA | 10 |
| 15 | 45 | short | 50 | 70 | 20 | AAEM | 10 |
| 16 | 50 | short | 70 | 85 | 15 | none | — |
| 17 | 35 | medium | 30 | 59 | 31 | AAEM | 10 |
| 18 | 45 | medium | 70 | 78 | 12 | ALMA | 10 |
| 19 | 35 | long | 50 | 75 | 25 | none | — |
| 20 | 40 | long | 70 | 79 | 11 | AAEM | 10 |
| 21 | 45 | long | 10 | 46 | 44 | VMA | 10 |
| 22 | 40 | medium | 10 | 53 | 47 | none | — |
| 23 | 50 | long | 30 | 58 | 32 | ALMA | 10 |

[1]wt % based on total polymer solids
[2]calculated $T_g$ from Fox-Flory equation
[3]ALMA = allyl methacrylate; VMA = vinyl methacrylate; AAEM = acetoacetoxyethyl methacrylate

EXAMPLE 24

Preparation of Coating Compositions

The latexes of Examples 13–23 were formulated as follows: 43.8 g latex, 2.7 g water, and 35 g of a catalyst mixture. This catalyst mixture was comprised of 63.2 parts EASTMAN EB, 17.7 parts Cobalt HYDROCURE II, 6.4 parts SURFYNOL 465, and 12.7 g SURFYNOL 104PA. Samples were allowed to stand overnight, at which time they were applied to glass at 6 mil wet thickness. The resulting films were cured under ambient conditions (50% RH and 70° F.) for 14 days. Half of the total available samples were then at 150° C. for 30 min to affect ultimate cure. Both ambient and high temperature cure films were evaluated for solvent resistance (methyl ethyl ketone or MEK double rubs), pendulum hardness, and surface tack. The results are presented in Table 4.

TABLE 4

| Example | Acrylic Tg | LOF Acrylic Monomer | wt %/type alkyd[3] | MEK Rubs ambient | MEK Rubs baked | Pendulum Hardness[2] ambient | Pendulum Hardness[2] baked | Surface Tack[3] ambient | Surface Tack[3] baked |
|---|---|---|---|---|---|---|---|---|---|
| 13 | 10 | ALMA | 35/S | 52 | 71 | 8 | 19 | 4.0 | 4.8 |
| 14 | 30 | VMA | 40/S | 85 | 313 | 25 | 80 | 4.9 | 5.0 |
| 15 | 50 | AAEM | 45/S | 107 | 307 | 26 | 111 | 5.0 | 5.0 |
| 16 | 70 | none | 50/S | 20 | 50 | 35 | 89 | 4.9 | 5.0 |
| 17 | 30 | AAEM | 35/M | 30 | 1000 | 37 | 82 | 5.0 | 5.0 |
| 18 | 70 | ALMA | 45/M | 62 | >1000 | 43 | 138 | 5.0 | 5.0 |
| 19 | 50 | none | 35/L | 15 | 7 | 36 | 87 | 4.9 | 5.0 |
| 20 | 70 | AAEM | 40/L | 49 | 110 | 62 | 107 | 4.9 | 5.0 |
| 21 | 10 | VMA | 45/L | 40 | 27 | 2 | 16 | 3.5 | 4.8 |
| 22 | 10 | none | 40/M | 47 | 13 | 2 | 26 | 3.0 | 4.8 |
| 23 | 30 | ALMA | 50/L | 74 | 257 | 7 | 40 | 4.0 | 4.9 |

[1]S - short oil alkyd; M - medium oil alkyd; L - long oil alkyd
[2]measure using a Gardner Pendulum Hardness Tester
[3]determining by firm finger pressure for 10 seconds
ratings are 0-will not release; 3-tacky; 4-slight tack; 5-no tack

EXAMPLE 25

Bond Strength of Examples 13–23

The formulated samples of Examples 13–23 were coated onto an oriented polypropylene film (Mobil 100 LBW) with a #3 RD rod. Another piece of the same film was immediately placed over the coating, and the two films were pressed together for three seconds using a Sentinel Heat Sealer (no heat, 40 psi jaw pressure). The bond strength between the films was measured after 18 hours using an Instron Tensile Tester. The results are presented in Table 5

TABLE 5

| Example | Bond Strength grams/inch |
|---|---|
| 13 | 300 before film tear |
| 14 | 230 before film tear |
| 15 | film tear |
| 16 | 10 |
| 17 | 10 |
| 18 | 0 |
| 19 | 0 |
| 20 | 0 |
| 21 | 70 |
| 22 | 140 |
| 23 | 70 |

EXAMPLE 26

Bond Strength of Examples 16–17, 19–20 and 23

The formulated samples of Examples 13–23 (Table 5) which exhibited relatively low adhesive bond strengths were tested for extrusion lamination strength. The polypropylene film was coated as described in Example 25 and the coatings allowed to cure for 24 hours. A metallized film coated with polyethylene was then placed on top of the polypropylene film with the polyethylene facing the test coating. The two films were then pressed together for three seconds using a Sentinel Heat Sealer (300 F, 40 psi jaw pressure). The bond strength between the films was then measured using an Instron Tensile Tester. The results are presented in Table 6.

TABLE 6

| Example | Bond Strength grams/inch |
|---|---|
| 16 | 50 |
| 17 | 50 |
| 19 | 30 |
| 20 | 80 |
| 23 | 250 |

EXAMPLE 27

Latex Compositions

Latex compositions summarized in Table 7 were prepared using the medium oil alkyd of Example 12 and following the general emulsion polymerization procedure of Examples 13–23.

TABLE 7

| | alkyd | | | acrylic composition | | | |
|---|---|---|---|---|---|---|---|
| Sample | wt % alkyd[1] | oil length | acrylic Tg[2] °C. | styrene wt % | 2EHA wt % | ALMA wt % | MAA wt % |
| A | 23 | medium | 75 | 73 | 12 | 10 | 5 |
| B | 23 | medium | 37 | 55 | 30 | 10 | 5 |
| C | 23 | medium | 35 | 57 | 30 | 10 | 3 |
| D | 23 | medium | 51 | 65 | 22 | 10 | 3 |
| E | 23 | medium | 81 | 79 | 8 | 10 | 3 |

[1]wt % based on total polymer solids
[2]calculated Tg from Fox-Flory equation
[3]2EHA = 2-ethylhexyl acrylate; ALMA = allyl methacrylate; MAA = methacrylic acid

EXAMPLE 28

Coating Performances

The latexes of Example 27 were formulated as follows: 26.4 g latex, 0.9 g water, 0.6 g 80/20 isopropanol/water, and 2.g of a catalyst mixture. This catalyst mixture was comprised of 63.2 parts EASTMAN EB, 17.7 parts Cobalt HYDROCURE II, 6.4 parts SURFYNOL 465, and 12.7 g SURFYNOL 104PA. Samples were allowed to stand overnight, at which time they were applied to glass at 6 mil wet thickness. The resulting films were cured under ambient conditions (50% RH and 70° F.) for 14 days. These ambient cure films were evaluated for solvent resistance (methyl ethyl ketone or MEK double rubs) and hardness (pendulum and Tukon). The results are presented in Table 8.

TABLE 8

| | | Film Thickness | Hardness | |
|---|---|---|---|---|
| Example | MEK Rubs | (mils) | Pendulum | Tukon |
| 27A | 1519 | 1.66 | 75 | 8.5 |
| 27B | 3302 | 1.87 | 37 | 2. |
| 27C | 3305 | 2.03 | 43 | 3.4 |
| 27D | 1837 | 5.02 | 39 | 3.9 |
| 27E | 209 | 1.51 | 76 | 8.6 |

Comparative Example 1

Paint Formulations Based on Acrylic-Modified Waterborne Alkyd Dispersions and Commercial Waterborne Acrylic and Alkyd Resins Each paint formulation A–D described in, respectively, Tables 9–12, was prepared by mixing the components with vigorous stirring in the order listed in the corresponding table. Sufficient water was then added to each formulation to reduce the formulation viscosity to 25–40 seconds as measured on a #2 Zahn cup. Films were cast to give a dry film thickness of 1.3–1.5 mils. These films were cured and tested at constant temperature and humidity (73.5° F.+/−3.5° F., 50% +/−5% relative humidity).

TABLE 9

| Paint A Formulation | |
|---|---|
| | Grams |
| Grind: | |
| Kelsol 3960-B2G-75 | 183.3 |
| Premix: | |
| Activ-8 | 0.92 |
| Cobalt HYDROCURE II | 5.68 |
| Then add: | |
| Eastman EB | 9.17 |
| Ti-Pure R706 | 188.80 |
| Letdown: | |
| Keisol 3960-B2G-75 | 69.65 |
| n-Butanol | 13.44 |
| sec-butanol | 12.83 |
| Ammonia | 13.44 |
| Eastman EB | 3.67 |
| Water | 474.14 |
| Total: | 975.04 |

TABLE 10

Paint B Formulation

| | Grams |
|---|---|
| Grind: | |
| Rhoplex WL-51 | 63.4 |
| Tamol 165 | 8.2 |
| Triton CF-10 | 0.9 |
| Patcote 519 | 0.5 |
| Ti-Pure R706 | 121.8 |
| Water | 6.4 |
| Total | 201.2 |
| Letdown: | |
| Rhoplex WL-51 | 375.9 |
| Water | 225.8 |
| Eastman EB | 91.1 |
| Eastman DB | 18.3 |
| Dibutylphthalate | 14.6 |
| Patcote 519 | 0.5 |
| Total: | 927.4 |

TABLE 11

Paint C Formulation

| | Grams |
|---|---|
| Grind: | |
| Keisol 3960-B2G-75 | 121.0 |
| Eastman EB | 8.4 |
| Aquacat | 1.9 |
| Magnacat | 3.9 |
| Patcote 519 | 0.9 |
| Patcote 577 | 0.9 |
| Ti-Pure R706 | 203.7 |
| Total | 340.7 |
| Letdown: | |
| Premix | |
| Keisol 3960-B2G-75 | 87.1 |
| 28% Ammonia | 5.8 |
| Water | 269.8 |
| Add | |
| Rhoplex WL51 | 251.3 |
| Eastman DB | 16.1 |
| 14% Ammonia | 0 |
| Total | 970.8 |

TABLE 12

Paint D Formulation

| | Grams | Order of Addition |
|---|---|---|
| Grind: | | |
| TiPure R746 Slurry | 130.40 | |
| Total | 130.40 | 7 |
| Letdown: | | |
| Latex from Ex. 18 | 378.80 | 1 |
| Cobalt HYDROCURE II | 6.00 | 2 |
| Dri-RX-HF | 0.80 | 3 |
| Eastman EB/water 50/50 | 50.00 | 4 |
| Surfynol 104 | 1.50 | 5 |

TABLE 12-continued

Paint D Formulation

| | Grams | Order of Addition |
|---|---|---|
| BYK-024 | 0.22 | 6 |
| 10% Ammonium Benzoate | 15.00 | 7 |
| Acrysol RM-1020 | 6.00 | 8 |
| Ammonia 14% | pH7.9–8.4 | 10 |
| Total | 588.72 | |

Comparative Example 2

Coating Performances

The coatings based upon paint formulations A–D of Comparative Example 1 were evaluated with regard to the properties of dry time, print resistance, pencil hardness, crosshatch adhesion, water immersion and specular gloss. The evaluations were conducted according to, respectively, ASTM D1640-83, ASTM D2091-88, ASTM D3363-92A, ASTM D3359-92A, ASTM D870-92, and ASTM D523-89. The results are summarized in Tables 13–16.

TABLE 13

Print Resistance (ASTM D2091-88)

| | | Cure Time (days) | | | |
|---|---|---|---|---|---|
| Paint Formulation | DFT (mils) | 1 | 3 | 7 | 14 |
| A | 1.5 | 0 | 2 | 2 | 2–4 |
| B | 1.3 | 6–8 | 10 | 10 | 10 |
| C | 1.3 | 6 | 8 | 8–10 | 8–10 |
| D | 1.4 | 8–10 | 10 | 10 | 10 |

TABLE 14

Pencil Hardness (ASTM D3363-92A)

| | | Cure Time (days) | | | |
|---|---|---|---|---|---|
| Paint Formulation | DFT (mils) | 1 | 3 | 7 | 14 |
| A | 1.5 | <5B | 4B | 4B | B |
| B | 1.3 | B | HB | HB | F |
| C | 1.3 | 2B | B | B | F |
| D | 1.4 | 2B | B | B | HB |

TABLE 15

Hot Water Resistance after exposure by 2 hour immersion in 60° C. water.

| Paint Formulation | Initial Hardness | 15 min Recovery | 3 hour recovery | Appearance after exposure |
|---|---|---|---|---|
| A | 2B | <5B | 3B | very little change |
| B | HB | 3B | HB | quite dull |
| C | HB | 4B | HB | quite dull |
| D | B | 3B | HB | no change |

TABLE 16

Dry Time, Crosshatch Adhesion and Gloss. Crosshatch Adhesion and Gloss were measured after 14 days cure at Ambient Conditions.

| Paint Formulation | DFT (mils) | Dry Time (mins) | Cure Thru (mins) | Crosshatch Adhesion | 60 Degree Gloss | 20 Degree Gloss |
|---|---|---|---|---|---|---|
| A | 1.5 | >360 | N/A | 4B | 83.5 | 59.4 |
| B | 1.3 | 15 | 115 | 5B | 64.7 | 42.8 |
| C | 1.3 | 12 | 110 | 5B | 68.3 | 22.9 |
| D | 1.4 | 15 | 75 | 5B | 93.2 | 64.9 |

The claimed invention is:

1. A latent oxidatively-functional-modified alkyd comprising the product of at least one latent oxidatively-functional monomer polymerized in the presence of a waterborne alkyd having at least one pendant sulfonate functionality, wherein the resulting latent oxidatively-functional-modified alkyd possesses sufficient available latent oxidatively-functional groups to increase the effective oxidative crosslinking of said latent oxidatively-functional-modified alkyd upon application to a substrate.

2. A latent oxidatively-functional-modified alkyd of claim 1, wherein said latent oxidatively-functional group is selected from the group consisting of allyl, vinyl, acetoacetyl, and enamine.

3. A latent oxidatively-functional-modified alkyd of claim 1, wherein said latent oxidatively-functional monomer is selected from the group consisting of allyl methacrylate, vinyl methacrylate, acetoacetoxyethyl methacrylate, hydroxybutenyl methacrylate, an allyl ester of maleic acid, a diallyl ester of maleic acid, and poly(allyl glycidyl ether).

4. A latent oxidatively-functional-modified alkyd of claim 1, wherein at least one latent oxidatively-functional monomer is copolymerized with at least one ethylenically unsaturated co-monomer in the presence of said waterborne alkyd.

5. A latent oxidatively-functional-modified alkyd of claim 4, wherein said ethylenically unsaturated co-monomer is selected from the group consisting of styrene, α-methyl styrene, vinyl naphthalene, vinyl toluene, chloromethyl styrene, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, glycidyl methacrylate, carbodiimide methacrylate, alkyl crotonates, vinyl acetate, di-n-butyl maleate, di-octylmaleate, t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea.

6. A latent oxidatively-functional-modified alkyd of claim 5, wherein said ethylenically unsaturated co-monomer is selected from the group consisting of styrene, α-methyl styrene, vinyl naphthalene, vinyl toluene, and chloromethyl styrene.

7. A water-based latex comprising water and a latent oxidatively-functional-modified alkyd comprising the product of at least one latent oxidatively-functional monomer polymerized in the presence of an aqueous dispersion of a waterborne alkyd having at least one pendant sulfonate functionality, wherein said latent oxidatively-functional-modified alkyd of the latex possesses sufficient available latent oxidatively-functional groups to increase the effective oxidative crosslinking of said latent oxidatively-functional-modified alkyd upon application of the latex to a substrate.

8. A water-based latex of claim 7, wherein said latent oxidatively-functional-modified alkyd comprises about 5–60 wt % of a waterborne alkyd based on the total solids of the latex and about 40–95 wt % of the latent oxidatively-functional monomer based on the total solids of the latex.

9. A water-based latex of claim 7, further comprising a cosurfactant and wherein the waterborne alkyd comprises about 5–35 wt % of the total solids of the latex.

10. A water-based latex of claim 7, wherein said latent oxidatively-functional group is selected from the group consisting of allyl, vinyl, acetoacetyl, and enamine.

11. A water-based latex of claim 7, wherein said latent oxidatively-functional monomer is selected from the group consisting of allyl methacrylate, vinyl methacrylate, acetoacetoxyethyl methacrylate, hydroxybutenyl methacrylate, an allyl ester of maleic acid, a diallyl ester of maleic acid, and poly(allyl glycidyl ether).

12. A water-based latex of claim 7, wherein at least one latent oxidatively-functional monomer is copolymerized with at least one ethylenically unsaturated co-monomer in the presence of said waterborne alkyd.

13. A water-based latex of claim 12, wherein said ethylenically unsaturated co-monomer is selected from the group consisting of styrene, α-methyl styrene, vinyl naphthalene, vinyl toluene, chloromethyl styrene, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, glycidyl methacrylate, carbodiimide methacrylate, alkyl crotonates, vinyl acetate, di-n-butyl maleate, di-octylmaleate, t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea.

14. A coating composition comprising a water-based latex of claim 7, and at least one additive selected from the group consisting of rheology and flow control agents, extenders, reactive coalescing aids, plasticizers, flatting agents, pigment wetting and dispersing agents and surfactants, ultraviolet (UV) absorbers, UV light stabilizers, tinting pigments, colorants, defoaming and antifoaming agents, anti-settling, anti-sag and bodying agents, anti-skinning agents, anti-flooding and anti-floating agents, biocides, fungicides and mildewcides, corrosion inhibitors, thickening agents, and coalescing agents.

15. A method of preparing a water-based latex comprising the step of polymerizing at least one latent oxidatively-functional monomer in the presence of an aqueous dispersion of a waterborne alkyd having at least one pendant sulfonate functionality, wherein said polymerizing step is conducted under conditions sufficient for the survival of the latent oxidative functionality of said monomer such that the latent oxidatively-functional-modified alkyd of the resulting latex possesses sufficient available latent oxidatively-functional groups to increase the effective oxidative crosslinking of said latent oxidatively-functional-modified alkyd upon application of said latex to a substrate.

16. A method of claim 15, wherein said latent oxidatively-functional group is selected from the group consisting of allyl, vinyl, acetoacetyl, and enamine.

17. A method of claim 1, wherein said latent oxidatively-functional monomer is selected from the group consisting of allyl methacrylate, vinyl methacrylate, acetoacetoxyethyl methacrylate, hydroxybutenyl methacrylate, an allyl ester of maleic acid, a diallyl ester of maleic acid, and poly(allyl glycidyl ether).

18. A method of claim 15, wherein the polymerization is an emulsion polymerization.

19. A method of claim 15, wherein at least one latent oxidatively-functional monomer is copolymerized with at least one ethylenically unsaturated co-monomer in the presence of said waterborne alkyd.

* * * * *